(12) United States Patent
Lee et al.

(10) Patent No.: US 10,792,849 B2
(45) Date of Patent: Oct. 6, 2020

(54) REMOTELY MOUNTED ELECTRIC MOTOR DRIVING A VALVE PIN IN AN INJECTION MOLDING APPARATUS

(71) Applicant: Synventive Molding Solutions, Inc., Peabody, MA (US)

(72) Inventors: Christopher Lee, Beverly, MA (US); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 456 days.

(21) Appl. No.: 15/860,788

(22) Filed: Jan. 3, 2018

(65) Prior Publication Data

US 2018/0186051 A1    Jul. 5, 2018

Related U.S. Application Data

(63) Continuation-in-part of application No. PCT/US2017/036542, filed on Jun. 8, 2017.
(Continued)

(51) Int. Cl.
*B29C 45/28* (2006.01)
*B29C 45/17* (2006.01)
(Continued)

(52) U.S. Cl.
CPC ........ *B29C 45/281* (2013.01); *B29C 45/1775* (2013.01); *B05B 1/3046* (2013.01);
(Continued)

(58) Field of Classification Search
CPC . B29C 45/281; B29C 45/1775; B29C 45/231; B29C 2045/1775;
(Continued)

(56) References Cited

U.S. PATENT DOCUMENTS

| 9,492,960 B2 | 11/2016 | Galati |
| 2010/0285170 A1 | 11/2010 | Galati |

(Continued)

FOREIGN PATENT DOCUMENTS

| EP | 2427318 B1 | 3/2012 |
| EP | 3009251 A1 | 4/2016 |

(Continued)

OTHER PUBLICATIONS

Written opinion of the International Searching Authority in corresponding PCT application No. PCT/US2018/012151 dated May 25, 2018.
(Continued)

*Primary Examiner* — Galen H Hauth
(74) *Attorney, Agent, or Firm* — Polsinelli, P.C.

(57) ABSTRACT

An injection molding apparatus comprising a valve comprised of:
an actuator having a rotor interconnected to a distal end of an elongated shaft adapted to drivably transmit rotational motion of the rotor to rotational motion of the shaft,
the shaft being interconnected at a proximal end to a converter adapted to transmit rotational motion of the shaft directly to driven linear motion of a valve pin,
the shaft having a length or configuration selected such that the actuator is mountable on the apparatus in a position or disposition that is isolated or insulated from significant or substantial exposure to or transmission of heat from a heated manifold.

27 Claims, 12 Drawing Sheets

Related U.S. Application Data

(60) Provisional application No. 62/489,178, filed on Apr. 24, 2017, provisional application No. 62/443,090, filed on Jan. 6, 2017, provisional application No. 62/442,717, filed on Jan. 5, 2017.

(51) Int. Cl.
   *B05B 1/30* (2006.01)
   *B29C 45/23* (2006.01)

(52) U.S. Cl.
   CPC ...... *B29C 45/231* (2013.01); *B29C 2045/282* (2013.01); *B29C 2045/2824* (2013.01); *B29C 2045/2837* (2013.01)

(58) Field of Classification Search
   CPC ...... B29C 2045/2837; B29C 2045/282; B29C 2045/2824; B05B 1/3046
   See application file for complete search history.

(56) References Cited

U.S. PATENT DOCUMENTS

| | | | | |
|---|---|---|---|---|
| 2014/0319729 | A1* | 10/2014 | Galati | ............ B29C 45/281 264/328.1 |
| 2016/0107352 | A1* | 4/2016 | Bazzo | ............ B29C 45/281 425/564 |

FOREIGN PATENT DOCUMENTS

| | | |
|---|---|---|
| EP | 2679374 B1 | 9/2016 |
| WO | 2001/060580 A1 | 8/2001 |

OTHER PUBLICATIONS

International Preliminary Report on Patentability in corresponding international application PCT/US2018/012151 dated Jul. 18, 2019.
International Search Report and Written Opinion in corresponding International Application No. PCT/US2017/036542; dated Aug. 23, 2017.

* cited by examiner

REMOTELY MOUNTED ELECTRIC MOTOR DRIVING A VALVE PIN IN AN INJECTION MOLDING APPARATUS

RELATED APPLICATIONS

This application claims the benefit of priority to U.S. application Ser. No. 62/442,717 filed Jan. 5, 2017 and also claims the benefit of priority to U.S. application Ser. No. 62/443,090 filed Jan. 6, 2017 and also claims the benefit of priority to U.S. Application Ser. No. 62/489,178 filed Apr. 24, 2017, the disclosures of all of the foregoing of which are incorporated by reference as if fully set forth herein.

This application is also a continuation in part of and claims the benefit of priority to PCT/US17/036542 filed Jun. 8, 2017 the disclosure of which is incorporated by reference as if fully set forth herein.

SUMMARY OF THE INVENTION

The present invention relates to the operation of a valve gate system with an electric motor mounted remotely where an elongated shaft that is interconnected to the drive shaft of the electric motor moves a valve pin axially upstream and downstream along the axis of the valve pin by rotating the shaft that is interconnected to the elongated drive shaft. In summary, a system or apparatus according to the invention:

- Contains a motor 10. 200 of which the actuator is comprised as described and shown herein can comprise any electrically driven rotary device that preferably includes a rotor 12 that is rotatably driven around a motor drive axis typically by an electrically powered coil.
- Preferably includes a gear reduction device 11 such as a gear-head or box to which the driven rotor 12 is connected and rotatably drives.
- Includes an elongated shaft 20 comprised of a rigid material such as steel that is interconnected to, extends from and is rotatably driven by the gearhead and communicates the gearhead's driven rotary motion to a device that converts the rotation of the elongated shaft to linearly driven motion referred to as a rotary to linear converter 40.
- Includes couplings that couple the shaft 20 to the gear head and to the rotary to linear converter 40 typically comprising one or more of a spline, socket, universal joint or flexible coupling.
  - If the rotary to linear converter is attached to the heated manifold, the couplings must accommodate thermal expansion both side to side and axially.
  - The electrically powered actuator 10, 200 is typically attached to the top clamp plate 140, but can be mounted elsewhere in the system remote from the heated manifold 60.

Methods of mounting the rotary to linear converter device:
- As shown in FIG. 1, the rotary to linear converter 40 is mounted to the top clamp plate (TCP, 140). The rotary to linear converter can be mounted to a top or bottom surface of the TCP 140, FIGS. 1, 2, 3, 4 or alternatively to the heated manifold 60, FIGS. 5, 6, 7. A cover can be included to cover the rotary to linear converter device, particularly if mounted to a bottom surface of the TCP 140.
  - Where the rotary to linear converter 40 is mounted to the TCP 140, a mechanism enabling the valve pin to slide axially must be provided in connection with the pin to rotary to linear converter interface or interconnection.
  - The rotary to linear converter device may include a cooling circuit.
  - The elongated shaft 20 interconnected to the rotary to linear converter 26 typically enters the housing 40 for the rotary to linear converter from a side wall that is disposed radially relative to the axis of movement of the member of the rotary to linear converter that moves linearly or the axis of movement of the valve pin. The rotary to linear converter assembly or the elongated shaft may be cut into or disposed the top (or upstream), bottom (or downstream) or through a side surface of the TCP 140.
- The rotary to linear converter assembly or device may be mounted to the heated manifold 60.
  - It may be bolted directly
  - It may have a cooling circuit (typically water) included in the housing.
  - It may be bolted to the manifold and include a member that contacts both the housing of the converter assembly and the TCP 140 such that heat is convected from the housing 40h to the TCP thus cooling the moving or driven members of the converter assembly 40.
- The rotary to linear converter device or assembly 40 can be doweled to locate it relative to the manifold 60 (to address thermal expansion) and arranged such that a surface of the housing is urged into compressed contact with a surface of the TCP so that heat is convected away from the housing to the cool TCP. A cover or removable plate or member may be included that encloses the rotary to linear converter device or assembly within an enclosed space within the TCP.
  - Springs or thrust pads (which are typically stiff springs) can be included as a mount for the rotary to linear converter device or assembly.
  - The rotary to linear converter device 40 or assembly may include a cooling circuit or mechanism.
  - The elongated shaft 20 that drives the moving members c can enter the housing 40h for the rotary to linear converter device through a side wall or from a direction disposed radially relative to the axis of travel of the member that is driven linearly or the axis of travel of the valve pin. The elongated shaft may be cut into or disposed within a top (upstream), bottom (downstream) or through a side or radially disposed surface of the TCP.
- The rotary to linear converter device or assembly can comprise a screw assembly where the axis of rotary motion is changed or redirected to axis that is non coaxial such as 90 degrees, the redirected or changed rotary motion then linearly driving a screw. A nut can be included that is rotationally fixed but moves axially. The nut in turn is interconnected to and linearly moves the valve pin (via a coupling that enables the valve pin to move radially relative to the linear travel axis of the pin or linearly moving nut).
- The screw may be a lead screw, ball screw, roller screw.
- Alternatively, the nut of the rotary to linear converter can be rotationally driven and the screw can be rotationally fixed, but free to move linearly or axially.
- The rotary to linear converter device or assembly can comprise a rack and pinion device where the pinion is drivably rotated by the elongated shaft which in turn drives a rack that is in turn coupled to a valve pin.

The length of the elongated shaft that connects the electric actuator or motor and gear apparatus to the rotary to linear converter can vary in length. The elongated shaft doesn't vary in length during operation, but can be adjusted or varied according to the application as needed to suit the tool.

The gate closed position of the pin can be established by several means.

The electrically powered actuator or motor can include a sensor that sends a signal to a controller that includes a program that controls timing, direction and speed of drive of the rotary to linear converter and the valve pin.

A mechanical stop can be included that is user-defined that limits the extent of the axial position of the pin in the closed direction.

There may also be a mechanical stop closer to the motor. Of these, the first is preferred as it is easier and prevents the situation where the motor it trying to move against a mechanical stop. The inertia of the mechanical parts would be absorbed suddenly by the adjustment.

In accordance with the invention there is provided an injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) having a rotor (12) rotatably driven (R1) at a rotor speed (R1s), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s), the actuator (200) being mounted to one or the other of a top clamp plate (140) or the injection molding machine (IMM), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a length or configuration (LC) selected and adapted such that the actuator (200) is mountable on the apparatus in a position or disposition that is isolated, separated or insulated from significant or substantial exposure to or transmission of heat from the heated manifold (60) through air or metal to metal contact between the heated manifold (60) and the actuator (200).

In such an apparatus the valve (50) can include a torque increasing or rotational speed reducing device (11) interconnected to and between the rotor (12) and the elongated shaft (20) in an arrangement wherein rotational movement (R1) of the rotor is transmitted to rotational movement (R2) of the elongated shaft (20).

The torque increasing or rotational speed reducing device (11) is preferably adapted to convert the rotational speed (R1s) and a torque (T1) generated by the rotor (12) to a different rotational speed (R2s) and a different torque (T2) generated by the elongated shaft (20).

The torque increasing or rotational speed reducing device (11) is preferably adapted to convert the rotational speed (R1s) and a torque (T1) generated by the rotor (12) to a lower rotational speed (R2s) and a higher torque (T2) generated by the elongated shaft (20).

The actuator (200) can be controllably rotationally (R1) drivable to controllably drive the valve pin (100) linearly (A) via the interconnection of the rotor (12) to the elongated shaft (20) and the interconnection of the elongated shaft to the converter (40) and the interconnection of the converter (40) to the linear drive member (26) and the interconnection of the linear drive member (26) to the valve pin (100).

The shaft (20) is preferably rigid and can be comprised of a rigid metal material.

Such an apparatus preferably further includes a position sensor (PS) that senses position of the valve pin (100, 130) or the linear drive member (26). The position sensor (PS) is preferably adapted to send a signal indicative of the position of the valve pin to a controller (800) that uses the signal in a program having instructions that use the position of the valve pin (100, 130) or linear drive member (26) to control opening and closing of the gate (110) by the pin (100, 1300 or control rate of flow of injection fluid (9) through the gate (110) via controlled positioning of a tip end (100t) of the pin (100, 130) relative to the gate.

The program typically includes instructions that instruct the actuator (10, 200) to drive the valve pin (100, 130), based on the use of the signal indicative of position, from a gate closed position upstream at a reduced velocity relative to a maximum velocity over the course of a selected path of travel between the gate closed position and a full upstream valve pin position.

The program can include instructions that instruct the actuator (10, 200) to drive the valve pin (100, 130) based on the use of the signal indicative of position, downstream from a selected position upstream of the gate closed position at a reduced velocity relative to a maximum velocity over the course of a selected path of travel between the selected position upstream and the gate closed position.

The position sensor (PS) can comprise a Hall Effect Sensor that senses a magnetic field generator or magnet (M) that travels linearly together with the linear drive member (26) or valve pin (100, 130).

The heated manifold (60) is preferably mounted between the upstream top clamp plate (140) and the mold (70), the heated manifold (60) being expandable or translationally movable relative to the top clamp plate (140) or the injection molding machine.

The converter (40) is preferably mounted to the apparatus such that the converter (40) travels laterally or in a direction along a lateral axis of the shaft (LS) relative to the actuator (200) on heating of the manifold (60) or upon assembly of the apparatus, the elongated shaft (20) being interconnected to the converter (40) or the actuator (200) by one or more connectors (15, 30) that are adapted to enable lateral movement (LS) between the converter (40) and the actuator (200) while maintaining a rotational interconnection between the elongated shaft and the converter.

The one or more connectors (15, 30) can include a spline device (202s, 32s, 17s, 42s).

The converter (40) can be mounted to the apparatus such that the converter (40) travels in a direction radially or front to back (FBS), axially (AS) or along another direction relative to the actuator (200) on heating of the manifold (60) or upon assembly of the apparatus, the elongated shaft (20) being interconnected to the converter (40) or the actuator (200) by one or more connectors (15, 30) that are adapted to enable translational movement of the converter (40) in a radial or front to back (FBS), or axial (AS) direction of the converter (40) and maintain a rotational interconnection of the elongated shaft (20) to the actuator (200) and to the converter (40).

The one or more connectors (15, 30) can include one or more hinges (15h1, 15h2) that are pivotably interconnected in an arrangement that enables the one or more hinges (15h1, 15h2) to co rotate with each other and simultaneously pivot relative to each other.

The elongated shaft (20) can be interconnected to the converter (40) in an arrangement wherein the shaft axis (DA) is disposed generally radially normal to the linear path of travel (A) of the valve pin.

The valve pin (100) is typically mounted to the manifold (60).

The converter (40) can be mounted to the heated manifold (60) such that the converter (40) travels together with movement of the heated manifold (60) and the actuator (200) is mounted to the top clamp plate (140), the top clamp plate (140) and the heated manifold moving relative to each other on heating of the heated manifold to operating temperature.

The converter (40) and the actuator (200) can be mounted to the top clamp plate (140), the top clamp plate (140) and the heated manifold (60) moving relative to each other on heating of the heated manifold to operating temperature.

The converter (40) is typically mounted in an arrangement wherein the converter (40) and converter housing (40h) receive heat generated by the heated manifold (60), the apparatus including a cooling device (300) comprised of a heat conductive plate (300p) having a first downstream facing heat conductive undersurface (300s2) mounted onto or into heat conductive engagement with a heat conductive surface (40ss) of the converter (40), the cooling device including heat conductive wings or projections (300w) that laterally extend from the plate (300p) having surfaces (300s1) adapted to engage a heat conductive surface (140ps) of the top clamp plate (140, 140p), the heat conductive plate (300p) transmitting heat received by the converter (40) and the housing (40h) from the heat conductive surface (40ss) through the wings or projections (300w) to the top clamp plate (140, 140p).

The wings or projections (300w) of the cooling device typically comprise a resilient or resiliently deformable spring, the clamp plate (140, 140p), cooling device (300), mold, manifold and converter (40) being adapted such that when assembled together in an operative arrangement, the wings or projections 300w are spring loaded urging the upstream facing surfaces (300s) into compressed thermally conductive engagement with a complementary surface (140ps) of the top clamp plate (140, 140p).

The elongated shaft (20) is preferably interconnected between the actuator (200) and the converter (40) by a movement accommodation connector (15, 30) adapted to enable translational movement of the converter (40) relative to the actuator (200) and to simultaneously interconnect the actuator (200), the elongated shaft (20) and the converter (40) such that the elongated shaft (20) and the converter (40) are rotatably drivable by the actuator (200).

The movement accommodation connector (15, 30) is preferably adapted to enable translational movement of the converter (40) in three axial directions normal to each other or in three dimensions.

The movement accommodation connector (15, 30) can comprise one or more of a spline connector, a universal joint, a flexible connector and a socket connector.

In another aspect of the invention there is provided a method of performing an injection molding cycle comprising injecting an injection fluid into a cavity of a mold employing an apparatus according to any of the foregoing claims.

In another aspect of the invention there is provided an injection molding apparatus comprised of an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, a valve assembly (50) comprising:

an actuator (200) having a rotor (12) rotatably driven (R1) at a rotor speed (R1s) and rotor torque (T1), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s) and shaft torque (T2) different from the rotor speed (R1s) and rotor torque (T1), the elongated shaft (20) being interconnected at a proximal end (24) to a converter (40), the converter (40) being adapted to convert rotational motion (R2) of the elongated shaft (20) to driven linear motion (A) of a linear drive member (26), the linear drive member (26) being interconnected to a valve pin (100) arranged within the fluid delivery channel for upstream and downstream movement along a linear path of travel (A) between gate closed and gate open positions, the elongated shaft (20) having a length or configuration (LC) selected and adapted such that the actuator (200) is mountable on the apparatus in a position or disposition that is isolated or insulated from significant or substantial exposure to or transmission of heat from the heated manifold through air or through metal to metal contacts between the heated manifold (60) and the actuator (200).

The valve (50) typically includes a torque increasing or rotational speed reducing device (11) interconnected to and between the rotor (12) and the elongated shaft (20) in an arrangement wherein rotational movement (R1) of the rotor is transmitted to rotational movement (R2) of the elongated shaft (20). The torque increasing or rotational speed reducing device (11) is preferably adapted to convert the rotational speed (R1s) and a torque (T1) generated by the rotor (12) to a different rotational speed (R2s) and a different torque (T2) generated by the elongated shaft (20). The torque increasing or rotational speed reducing device (11) is preferably adapted to convert the rotational speed (R1s) and a torque (T1) generated by the rotor (12) to a lower rotational speed (R2s) and a higher torque (T2) generated by the elongated shaft (20).

The actuator (200) is preferably controllably rotationally (R1) drivable to controllably drive the valve pin (100) linearly (A) via the interconnection of the rotor (12) to the elongated shaft (20) and the interconnection of the elongated shaft to the converter (40) and the interconnection of the converter (40) to the linear drive member (26) and the interconnection of the linear drive member (26) to the valve pin (100).

The shaft (20) is typically comprised of a rigid metal material.

Such an apparatus can further include a position sensor (PS) that senses position of the valve pin (100, 130) or the linear drive member (26).

The position sensor (PS) is preferably adapted to send a signal indicative of the position of the valve pin to a controller (800) that uses the signal in a program having instructions that use the position of the valve pin (100, 130) or linear drive member (26) to control opening and closing of the gate (110) by the pin (100, 1300 or control rate of flow of injection fluid (9) through the gate (110) via controlled positioning of a tip end (100t) of the pin (100, 130) relative to the gate.

The program can include instructions that instruct the actuator (10, 200) to drive the valve pin (100, 130), based on the use of the signal indicative of position, from a gate closed position upstream at a reduced velocity relative to a maximum velocity over the course of a selected path of travel between the gate closed position and a full upstream valve pin position.

The program can include instructions that instruct the actuator (10, 200) to drive the valve pin (100, 130) based on the use of the signal indicative of position, downstream from a selected position upstream of the gate closed position at a reduced velocity relative to a maximum velocity over the course of a selected path of travel between the selected position upstream and the gate closed position.

The position sensor (PS) typically comprises a Hall Effect Sensor that senses a magnetic field generator or magnet (M) that travels linearly together with the linear drive member (26) or valve pin (100, 130).

The heated manifold (60) is preferably mounted between an upstream top clamp plate (140) and the mold (70), the actuator (10, 200) being mounted to one or the other of the top clamp plate (140) or the injection molding machine (IMM), the converter (40) being housed in a housing (40h) that is spaced apart from the actuator (10, 200) and connected via the elongated shaft (20).

The converter housing (40h) is typically mounted to the heated manifold (60).

In another aspect of the invention there is provided an injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) mounted to one or the other of a top clamp plate (140) and the injection molding machine (IMM), the actuator (200) having a rotor (12) rotatably driven (R1) at a rotor speed (R1s), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) being interconnected between the actuator (200) and the converter (40) by a movement accommodation connector (15, 30) adapted to enable translational movement of the converter (40) relative to the actuator (200) and to simultaneously interconnect the actuator (200), the elongated shaft (20) and the converter (40) such that the elongated shaft (20) and the converter (40) are rotatably drivable by the actuator (200), the elongated shaft (20) having a length or configuration (LC) selected and adapted such that the actuator (200) is mountable on the apparatus in a position or disposition that is isolated or insulated from significant or substantial exposure to or transmission of heat from the heated manifold (60) through air or through metal to metal contact between the heated manifold (60) and the actuator (200).

The movement accommodation connector (15, 30) is preferably adapted to enable translational movement of the converter (40) in three axial directions normal to each other or in three dimensions. The movement accommodation connector (15, 30) typically comprises one or more of a spline connector, a universal joint, a flexible connector and a socket connector.

In another aspect of the invention there is provided an injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) mounted to one or the other of a top clamp plate (140) and the injection molding machine (IMM), the actuator (200) having a rotor (12) rotatably driven (R1) at a rotor speed (R1s), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a length or configuration (LC) selected and adapted such that the actuator (200) is mountable on the apparatus in a position or disposition that is isolated or insulated from significant or substantial exposure to or transmission of heat from the heated manifold (60) through air or through metal to metal contact between the heated manifold (60) and the actuator (200), the converter (40) being mounted to the heated manifold (60) in an arrangement wherein the converter (40) and converter housing (40h) receive heat generated by the heated manifold (60), the apparatus including a cooling device (300) comprised of a heat conductive plate (300p) having a first downstream facing heat conductive undersurface (300s2) mounted onto or into heat conductive engagement with a heat conductive surface (40ss) of the converter (40), the cooling device including heat conductive wings or projections (300w) that laterally extend from the plate (300p) having surfaces (300s1) adapted to engage a heat conductive surface (140ps) of the top clamp plate (140, 140p), the heat conductive plate (300p) transmitting heat received by the converter (40) and the housing (40h) from the heat conductive surface (40ss) through the wings or projections (300w) to the top clamp plate (140, 140p).

The wings or projections (300w) of the cooling device preferably comprise a resilient or resiliently deformable spring, the clamp plate (140, 140p), cooling device (300), mold, manifold and converter (40) being adapted such that when assembled together in an operative arrangement, the wings or projections 300w are spring loaded urging the upstream facing surfaces (300s) into compressed thermally conductive engagement with a complementary surface (140ps) of the top clamp plate (140, 140p)

In another aspect of the invention there is provided a method of performing an injection molding cycle comprising injecting an injection fluid into a cavity of a mold employing an apparatus according to any of the apparatuses described above.

In another aspect of the invention there is provided a method of performing an injection cycle in an injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, a valve (50) comprised of an actuator (200) having a rotor (12) rotatably driven (R1) at a rotor speed (R1s), the method comprising:

interconnecting the rotor (12) to a distal end (22) of an elongated shaft (20) adapted to drivably transmit rotational motion (R1) of the rotor to rotational motion (R2) of the elongated shaft (20) for rotation at a shaft speed or torque (R2s), interconnecting the elongated shaft (20) at a proximal end (24) to a converter (40), the converter (40) being adapted to transmit rotational motion (R2) of the elongated shaft (20) directly to driven linear motion (A) of a linear drive member (26), interconnecting the linear drive member (26) to a valve pin (100) arranged within the fluid delivery channel (130) for upstream and downstream movement along a linear path of travel (A) between gate closed and gate open positions via the driven linear motion (A) of the linear drive member (26), selecting and adapting the elongated shaft (20) to have a length or configuration (LC) that disposes the actuator (200) in a mountable position or location on the apparatus that is isolated or insulated from significant or substantial exposure to or transmission of heat from the heated manifold (60) through air or through metal to metal contact between the heated manifold (60) and the actuator (200).

Such a method typically further comprises interconnecting a torque increasing or rotational speed reducing device (11) to and between the rotor (12) and the elongated shaft (20) in an arrangement wherein rotational movement (R1) of the rotor is transmitted to rotational movement (R2) of the elongated shaft (20) at a lesser speed (R2s) and such that the elongated shaft (20) rotates with higher torque relative to speed of rotation (R1s) and torque of the rotor (12).

In another aspect of the invention there is provided a method according to any of the methods described above further comprising forming the elongated shaft (20) from a rigid metal material.

In another aspect of the invention there is provided a method according to any of the methods described above further comprising forming the elongated shaft (20) from a rigid metal material.

BRIEF DESCRIPTION DRAWINGS

FIG. 1 is a side sectional schematic view of an injection molding system showing electric actuators mounted on a top clamp plate in extended spaced apart interconnected relationship to a linear drive converter device and valve pins driven by the actuator, the linear drive converter device also being mounted to the top clamp plate.

FIG. 2. is a fragmentary enlarged detail side view of a distal end of an elongated rotatably driven shaft component of an actuator as shown in FIG. 1 also showing in schematic section a beveled gear interconnection of the elongated shaft to a linearly driven member that is interconnected to a valve pin for controlled linear drive.

DETAILED DESCRIPTION

Figure 1:
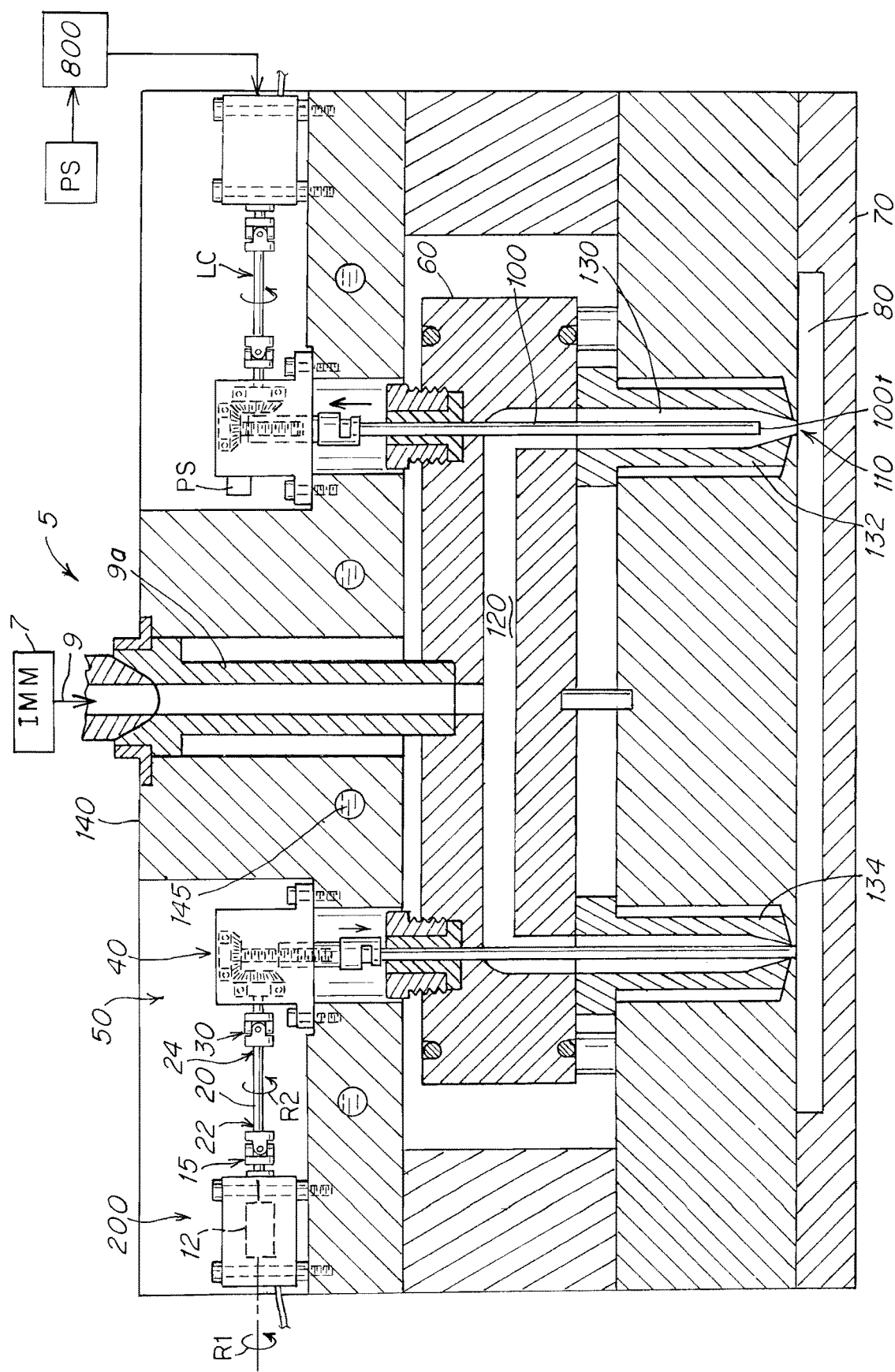

FIG. 1 shows a generic system or apparatus 5 according to the invention comprising an injection molding machine IMM that feeds a selected fluid 9 into an inlet 9*a* that in turns feeds into a distribution channel 120 of a heat manifold 60. As shown the manifold is disposed between an upstream mounted top clamp plate 140 and a downstream mounted mold 70 that forms a cavity 80 in which the part to be molded is formed from injection fluid 9 that is routed into the cavity via downstream gate 110 that communicates with nozzle channel 130 in which valve pin 100 is disposed for controlled upstream and downstream reciprocal movement along linear axis A between gate open and gate closed positions, the gate open position shown in FIG. 1 with respect to nozzle 132 and the gate open position shown with respect to nozzle 134.

Figure 2:
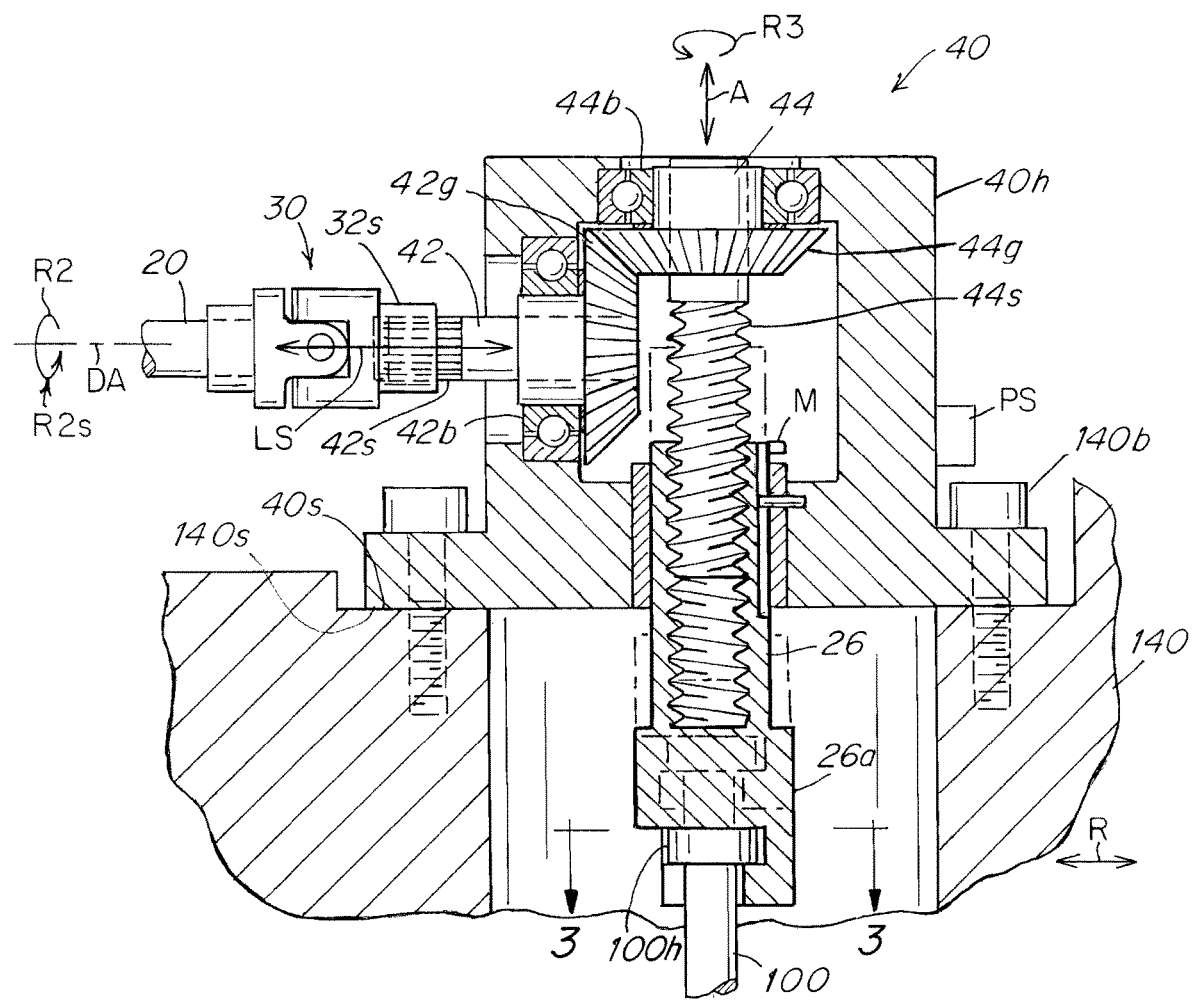

As shown in FIGS. 1, 2, a valve 50 is provided for controlling movement of the valve pin 100, the valve 50 comprising an electrically powered actuator 200 having, typically an electric motor having a rotor 12 rotatably driven by an electrically powered coil such as disclosed in U.S. Pat. No. 6,294,122 the disclosure of which is incorporated by reference as if fully set forth herein. The valve 50 includes a rigid, typically comprised of metal such as steel, elongated shaft 20 that is coupled to the rotating rotor 12 via coupling 15 at an upstream end 22 of the shaft 20 and a rotary to linear converter 40 that is coupled to a downstream end 24 of the elongated shaft 20 by coupling 30 such as a universal joint. The elongated and rigid configuration of the shaft 20 is selected so that the motor 200 and rotor 12 is necessarily disposed and mounted in a location or position that is isolated or insulated from transmission of heat from the heated manifold 60. The shaft 20 is selected to be comprised of a rigid metal material so that energy and torque force R2*s* derived from driven rotation R2 of the shaft 20 is reliably transmitted from the remotely mounted motor 200 to the rotary to linear converter assembly 40.

The converter 40 comprises a housing 40*h* that houses a rotary to linear device. In the embodiment shown in FIG. 1, the rotary to linear device comprises a bevel gear 42*g* that has a gear shaft 42 coupled to the elongated shaft 20 and mounted to housing 40*h* by bearings 42*b* for rotation R2 in unison with the shaft 20, rotation R2 of the gear shaft 42 in turn drivably rotates the bevel gear 42*g*. Bevel gear 42*g* is meshed with complementary bevel gear 44*g* that is rotatably mounted to the housing 40*h* via screw shaft 44 that is rotatably mounted to housing 40*h* via bearings 44*b*. As shown, the bevel gears 42*g*, 44*g* and their respective shafts 42, 44 are configured and arranged to transmit rotation around elongated shaft axis DA to a valve pin drive axis A that is non coaxial with axis DA. Driven rotation of bevel gear 42*g* results in driven rotation of screw shaft 44 that is screwably engaged with linearly travelling nut 26 which is in turn coupled to the head 100*h* of valve pin 100. Thus driven rotation of screw shaft 44 results in rotation of screw threads 44*s* that in turn results in linear driven movement along axis A of nut 26 and its interconnected valve pin 100.

When the system 5 is assembled and the heated manifold 60 is heated to a typical high operating temperature, the manifold 60 body will tend to physically expand in size thus causing translational movement of the body of the manifold 60 relative to the top clamp plate 140 and the mold body 70. Similarly components of the valve assembly such as the converter housing 40*h* and valve pin 100 that may be mounted to the heated manifold will translationally move in several directions such as laterally LS, axially AS and from front to back FBS, FIG. 8, namely in a direction in and out of the page as shown in FIGS. 4-7, while the motor 200 is stationarily mounted on the top clamp plate 140 or to another stationary structure of the system 5. To accommodate such in and out or front to back FBS movement, the joints 15, 30 are adapted to enable the shaft 20 to pivot in or along the FBS direction or axis together with movement of the housing 40 or motor 200 along the same FBS direction or axis. Joints 15, 30 that comprise a universal joint comprised of hinges such as hinges 15*h*1, 15*h*2 that may be pivotably connected to each other by a cross shaft 15*cs*. The cross shaft 15*cs* connections connects the hinge such that the two hinges 15*h*1, 15*h*2 can co rotate with each other along their respective rotational axes and simultaneously also to pivot in the FBS axis or direction relative to each other around the axis of the connecting cross shaft 15*cs* while still continuing to co rotate when the rigid shaft 20 is being rotatably driven.

Thus any components that may be mounted to the manifold 60 such as the converter housing 40 or valve pin 100 may translationally move relative to the motor 200 when the system is brought to operating temperature.

Figure 4:
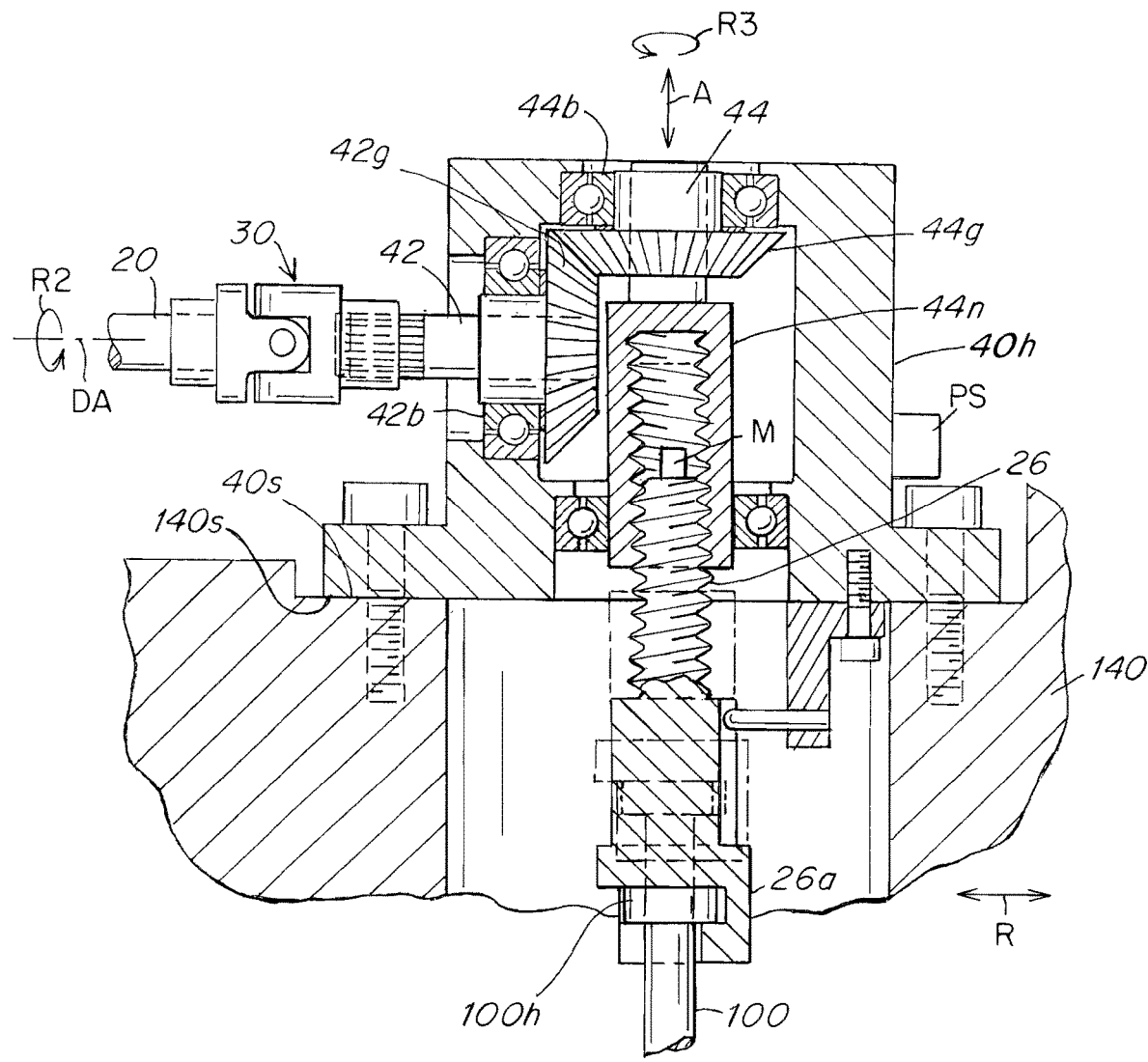
FIG. 4 is a side view similar to FIG. 2 showing an alternative embodiment of a geared interconnection between the enlongated shaft and the valve pin components of the system.
Figure 5:
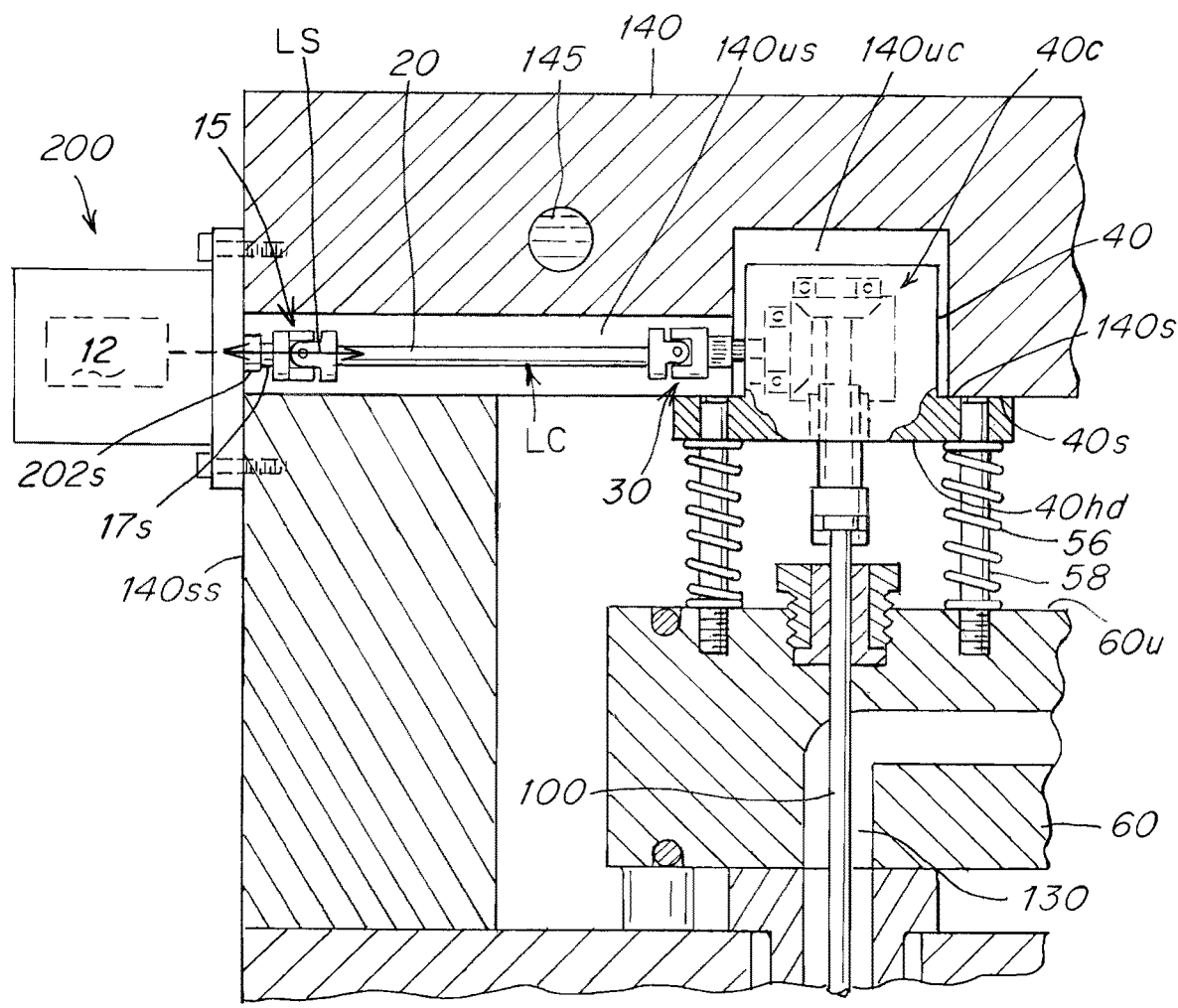
FIG. 5 is a fragmentary side sectional view similar to FIG. 1 showing an alternate arrangement for mounting the linear drive converter device to the heated manifold.
Figure 6:
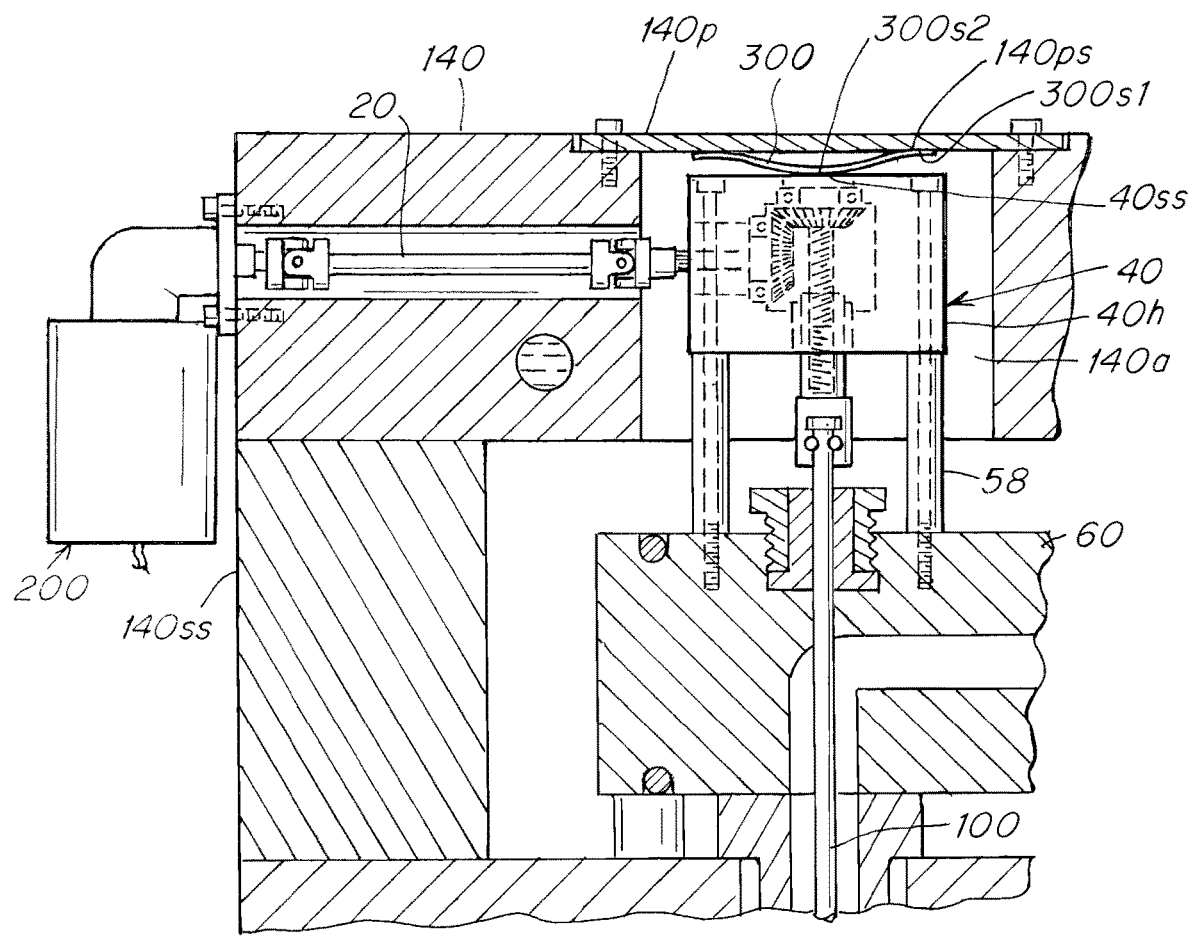
FIG. 6 is a fragmentary side schematic sectional view similar to FIG. 1 showing an alternate embodiment where the linear drive converter device is mounted to the heated manifold and cooled by a convection cooling member in contact with the top clamp plate and drive converter housing.
Figure 7:
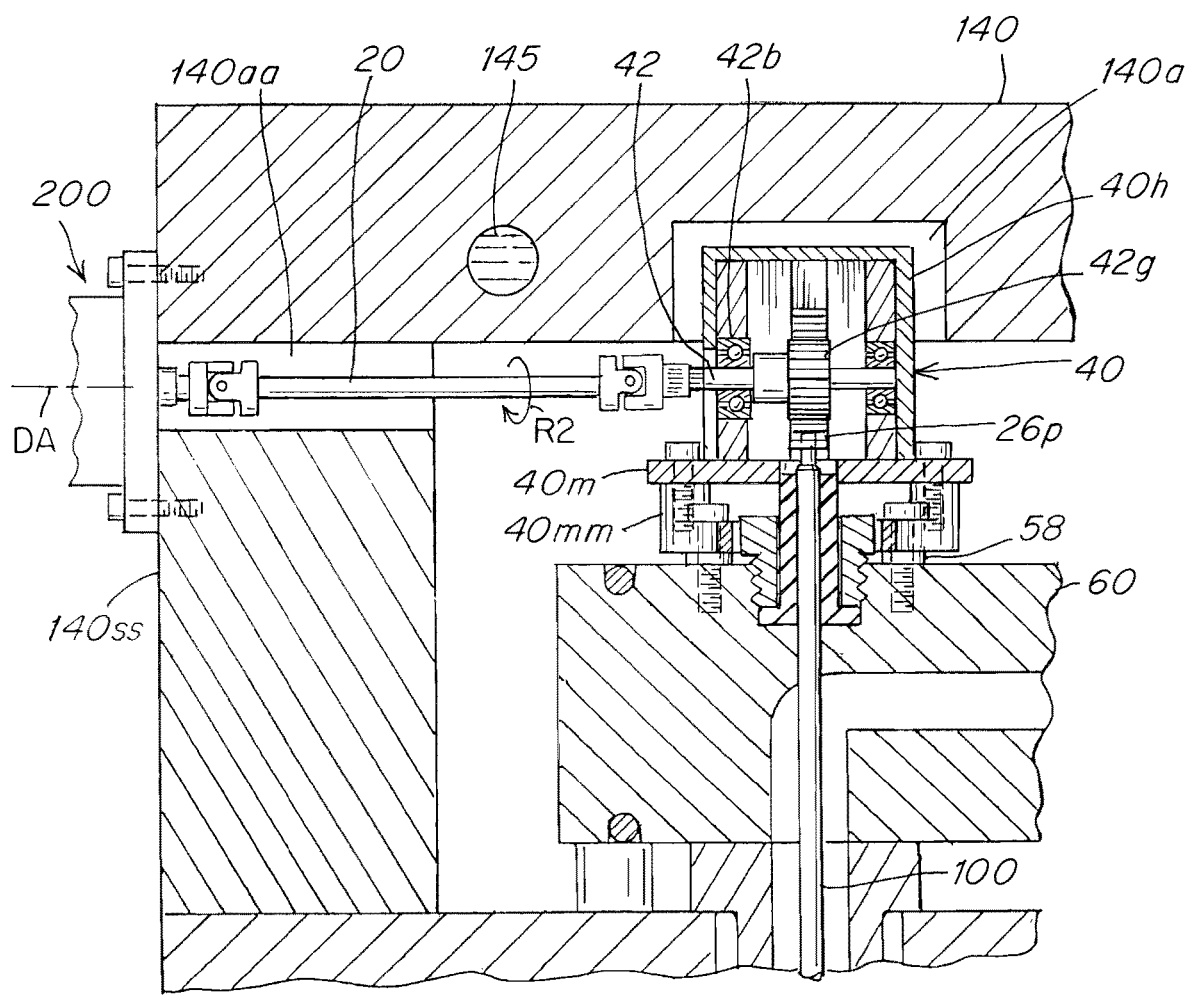
FIG. 7 is a fragmentary sectional view similar to FIG. 5 showing an alternative rack and pinion linear converter device mounted to the heated manifold.
Figure 7A:
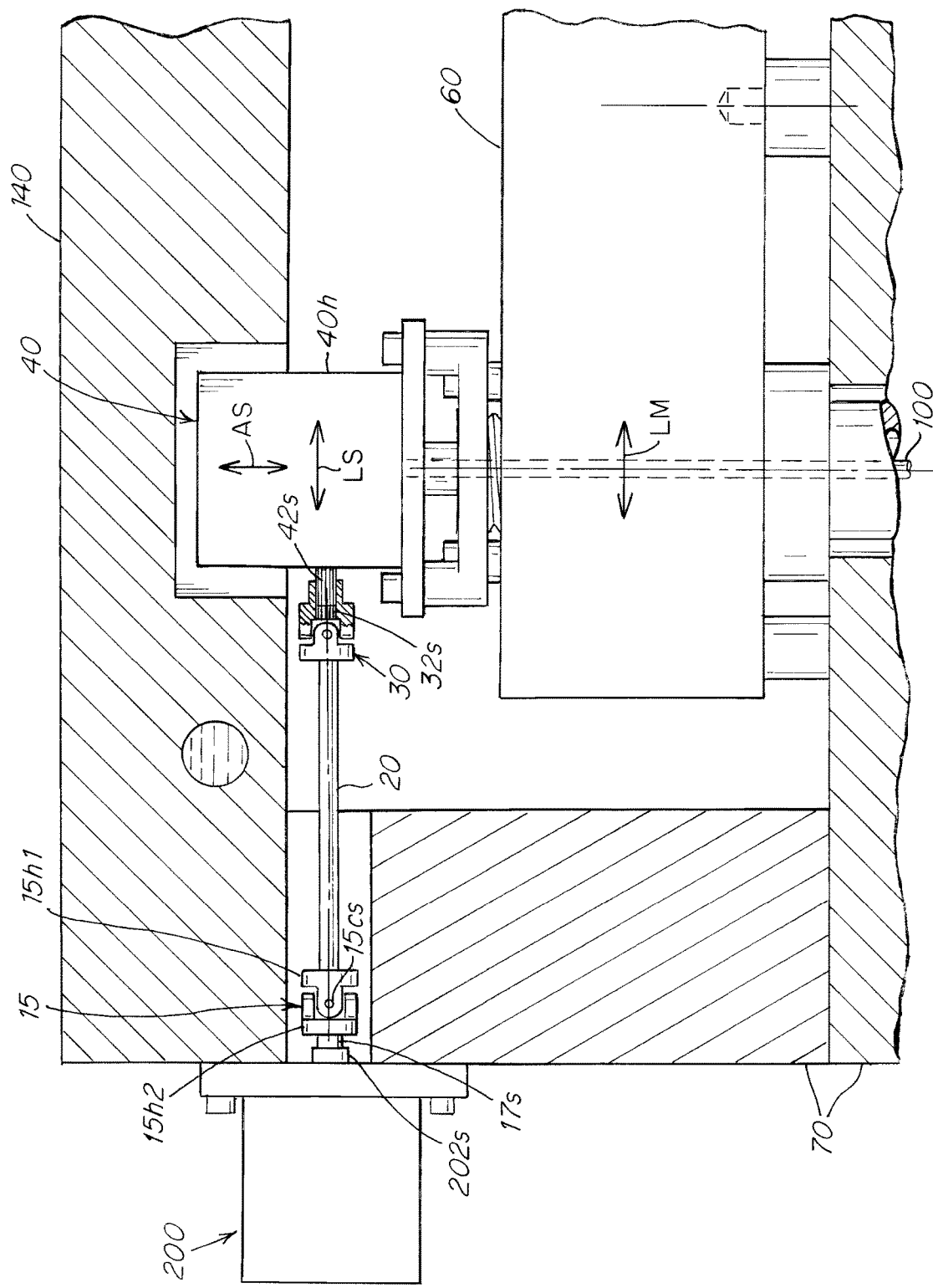
FIG. 7A is a fragmentary section view similar to FIG. 7 showing in schematic detail the linkages and connections between the elongated rigid shaft component and the motor and the converter.
Figure 8:
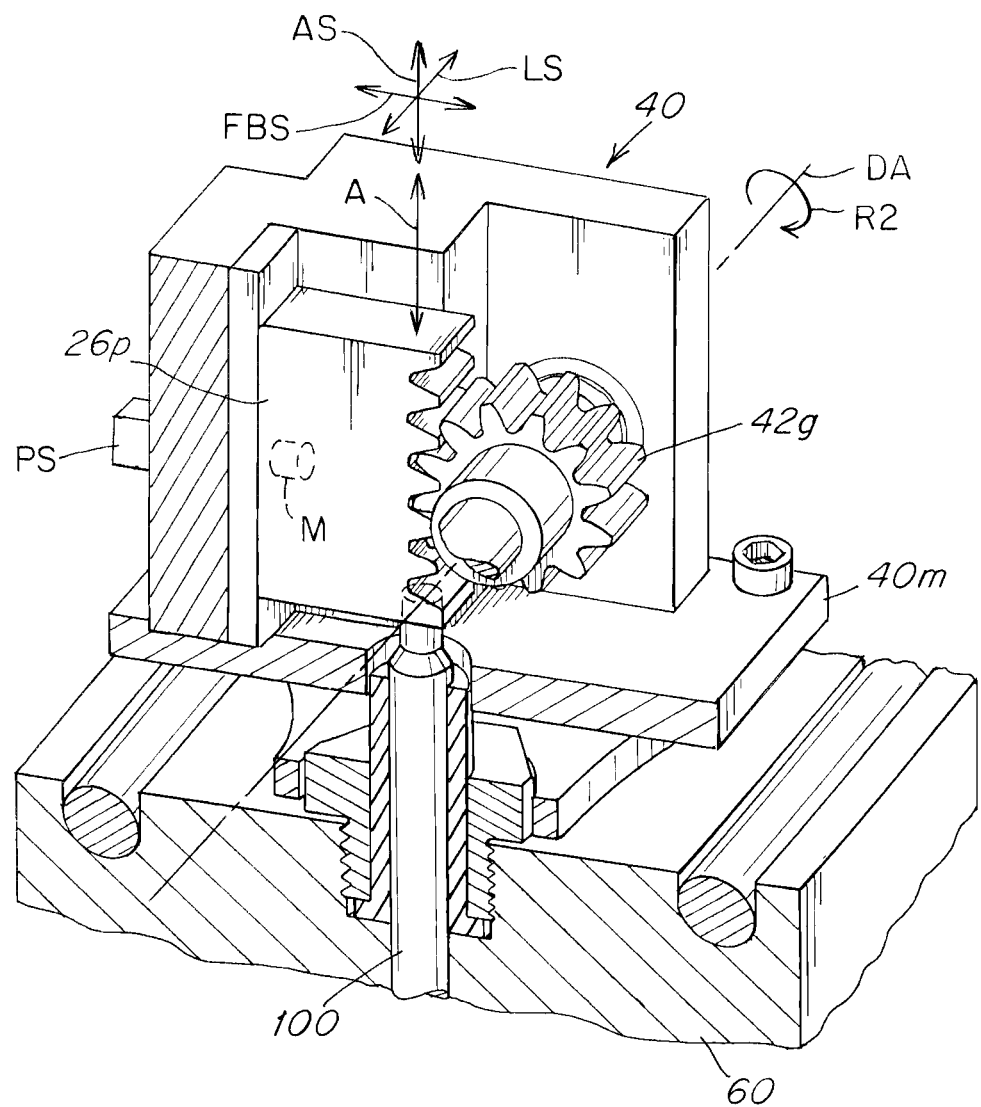
FIG. 8 is a fragmentary perspective view of the rack and pinion subassembly of FIG. 7 showing three axial directions or axes (LS, AS, FBS) in which the converter can move translationally relative to the actuator.

To accommodate such movement LS, FIGS. 7A, 8 and avoid breakage of the rigid shaft 20 or the connectors 15, 30, the connectors or couplings 15, 30 preferably include lateral movement connectors such as female 202*s*, 32*s* and complementary interconnected male 17*s*, 42*s* splines that enable and accommodate lateral movement LS of the converter housing 40*h* and valve pin relative to the stationary mounted actuator or motor 200 when the converter 40 is mounted to the heated manifold 60 as shown in FIGS. 5, 6, 7, 7A. The same or similar lateral movement connectors 202*s*, 32*s*, 17*s*, 42*s* also enable and accommodate any lateral movement LS, R of the converter housing 40*h* that may occur when the converter 40 is mounted to the top clamp plate as shown in FIGS. 1, 2, 4. Such lateral movement connectors 15, 30 are typically adapted to enable lateral sliding LS of the pivotably connected components of the connectors 15, 30 relative to each other, such via slidably and rotatably interconnected hinges 15*h*1 and 15*h*2 which are respectively rigidly connected to the rotatable rigid shaft 20 and motor rotor 12 thus enabling the shaft 20 and rotor 12 to move laterally LS relative to each other.

Couplings 15, 30 can comprise any flexible connection mechanism or connector such as as a spline, socket, universal joint or other flexible coupling. The flexible connection mechanism or connector 15, 30 further enables and accommodates translational movement of the converter housing 40*h* relative to the top clamp plate 140 and motor 200 in the axial direction AS and in a front to back, in and out or radial direction FBS, FIGS. 7A, 8 such axial and front to back movement occurring also when the heated manifold 60 expands upon being heated up to a typical high operating temperature. Where the connectors comprise universal joints, the hinges of the joints 15, 30 such as hinges 15*h*1, 15*h*2 enable and accommodate such axial and front to back movement by being typically pivotably connected to each other by a cross shaft 15*cs*. The cross shaft 15*cs* connections connects the hinge such that the two hinges 15*h*1, 15*h*2 can co rotate with each other along their respective rotational axes and also to pivot relative to each other around the axis of the connecting cross shaft 15*cs* while still continuing to co rotate when the rigid shaft 20 is being rotatably driven.

Figure 3:
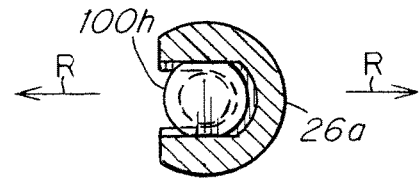
FIG. 3 is a cross sectional plan view of a pin connector along lines 3-3 of FIG. 2.

As shown in FIGS. 2, 3, 4 the head 100*h* of pin 100 is coupled to the downstream coupling end 26*a* of shaft 26. The coupling 26*a* and head 100*h* are adapted to enable the pin 100 to travel radially R relative to travel axis A to allow for radial movement R of pin 100 that can occur upon thermal expansion of manifold 60 in which pin 100 is mounted downstream. Such a coupling can comprise a configuration as disclosed in U.S. Pat. No. 9,492,960, disclosure of which is incorporated by reference as if fully set forth herein.

FIG. 4 shows an alternative embodiment of the FIGS. 1, 2 embodiment where the gear shaft 44 comprises a nut 44n that is rotatably driven and screwably engaged with a linearly moving screw 26 that is in turn coupled downstream 26a to the head 100h of the valve pin 100.

In the FIGS. 1-4 embodiments, the rotary to linear converter 40 is mounted to the top clamp plate 140 such that a highly heat conductive surface 40s of the housing 40 (which itself is typically comprised of a highly heat conductive material such as metal, steel or the like) is compressibly engaged against a surface 140s of the top clamp plate 140 which is also typically comprised of a highly heat conductive material such as metal, steel or the like. The compressed engagement of surfaces 40s and 140s with each other enables heat to be readily transmitted from housing 40h to the cooled or cooler body of the top clamp plate 140. The top clamp plate 140 is typically cooled via water that flows through cooling channels 145 bored within the top clamp plate 140.

FIG. 5 shows an alternative embodiment of the FIGS. 1-4 embodiments where the electrically powered actuator 200 is mounted on side surface 140ss of the top clamp plate 140 and the elongated shaft 20 and converter 40 are mounted within apertures or channels 140us, 140uc formed on the interior or underside of the top clamp plate. Again, the top clamp plate 140 is typically cooled via water that flows through cooling channels 145 bored within the top clamp plate 140. In the FIG. 5 embodiment, the converter 40 is mounted to the heated manifold 60 via bolts 58 and springs 56. The bolts 58 cause the converter housing 40h and its interconnected valve pin 100 to travel radially R together with radial expansion or travel of the heated manifold thus minimizing the necessity for prevention of pin decoupling or pin deformation due to radial expansion of the heated manifold 60. The springs 56 are resiliently compressibly engaged between an upstream surface 60u of the manifold 60 and a downstream surface 40hd of the housing 40h to cause an upstream facing heat conductive surface 40s of the housing 40 to compressibly engage with a downstream facing heat conductive surface 140s of the cooled top clamp plate thus working to cause heat from the manifold 60 that is transmitted to housing 40 to be transmitted from housing 40 to the cooled top clamp plate 140 thus cooling the converter housing 40 and the converter components 40c generally.

FIG. 6 shows another embodiment where the housing 40 is mounted to the manifold 60 via bolts 58 and the electric actuator 200 is adapted and arranged to be mounted in a non-coaxial arrangement as shown along a side surface 140ss of the top clamp plate 140. As shown the converter 40 is mounted within an enclosed cut out or aperture 140a formed within the body of the top clamp plate 140 with the aperture 140a being covered or enclosed by an upstream or top cover or plate 140p, the cover or plate 140p being comprised of a highly heat conductive material such as metal, steel or the like and being readily attachable to and detachable from the top clamp plate 140 for ready insertion and removal of the converter 40 to and from the aperture 140a. A cooling device typically comprising a highly heat conductive resiliently compressible spring 300 is disposed between an upstream facing surface 40ss of the housing 40 and a downstream facing surface 140ps of the cover 140p. The top clamp plate 140 is comprised of the cover 140p which is cooled together with the top clamp plate 140 via heat conductive contact between the top clamp plate 140 and the removable cover 140p. The spring 300 is compressed so that an upstream facing surface of the spring 300s1 makes compressed heat conductive contact with a downstream facing surface 140ps of the cover 140p and a downstream facing surface of the spring 300s2 makes compressed heat conductive contact with an upstream facing surface 40ss of the convertor housing 40h thus causing heat from the housing 40h to be conducted to the top clamp plate cover 140p and to the top clamp plate 140 generally. The top clamp plate 140 is typically cooled via water flow that is injected through cooling channels 140c provided within the body of the plate 140.

As shown in FIG. 7 the cooling device 300 is configured such that it comprises a plate 300p having a first downstream facing heat conductive undersurface 300s2 for mounting onto and into heat conductive engagement with the upstream surface 40ss of the heat conductive converter housing 40. The cooling device includes a pair of laterally and upstream extending wings or projections 300w that laterally extend to a distal end 300de that has opposing upstream facing surfaces 300s1 that engage the opposing downstream facing body surface 140ps of the top clamp plate cover 140ps. The projections 300w preferably comprise a resilient spring. The clamp plate 140, 140p, the cooling device 300, the mold, the manifold, the converter 40 are all configured, adapted, mounted or arranged such when assembled together in an operative arrangement, the wings or projections 300w are spring loaded urging the upstream facing surfaces 300s into compressed thermally conductive engagement with the top clamp plate 140, 140p.

Figure 9:
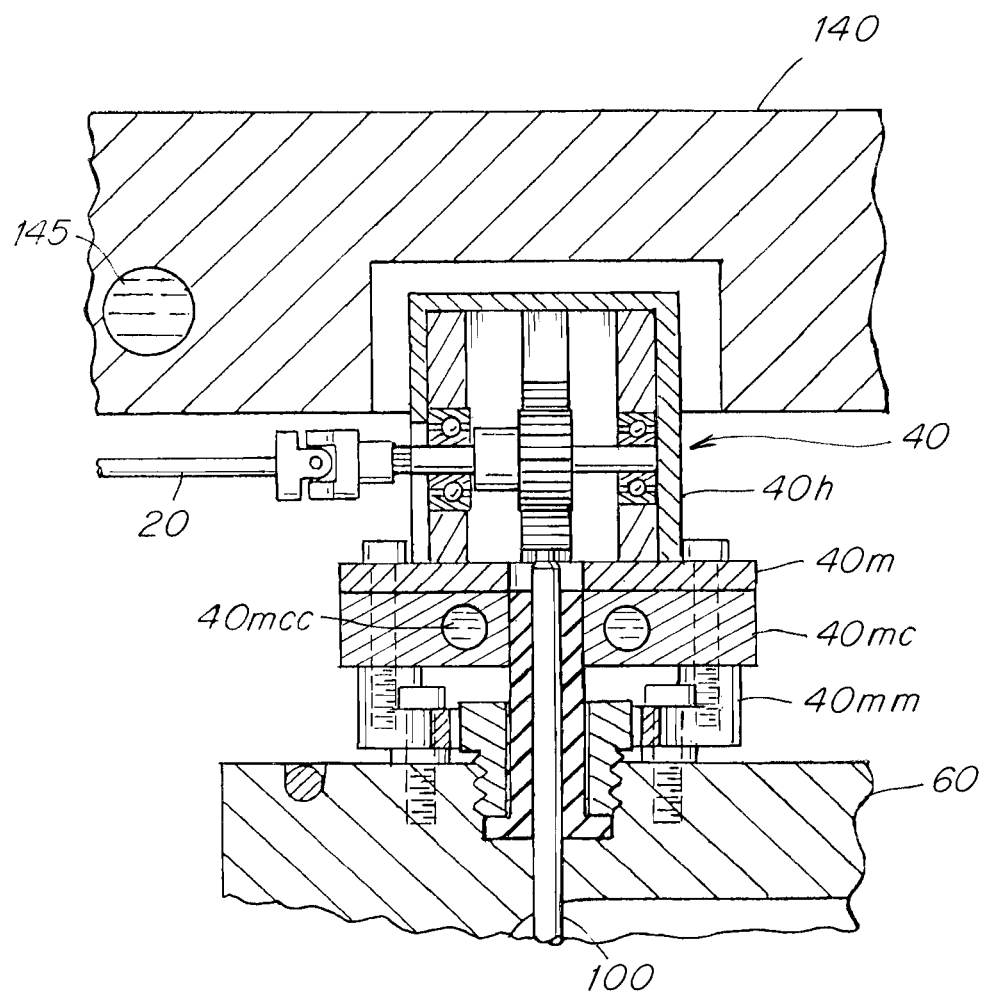
FIG. 9 is an enlarged detail of the rack and pinion device of the FIG. 7 system mounted to a water cooled mount intermediate the heated manifold and rack and pinion device.

FIG. 7 shows an alternative embodiment where the actuator 200 is mounted on a side surface 140ss of the top clamp plate 140 and the elongated or extended shaft 20 is disposed within an aperture 140aa formed in a downstream end of the top clamp plate 140. The converter 40 is mounted to the manifold 60 via intermediate mounts 40m, 40mm and bolts 58. In the FIGS. 7, 8 embodiment the converter 40 comprises a rack 26p and pinion 42g assembly where the gear of the pinion 26p is drivably rotatable R2 to cause, via engagement with teeth of the rack 26p, linear upstream downstream A movement of the rack 26p and its interconnected valve pin 100. As shown in FIG. 9, an intermediate cooling mount 40mc having cooling channels 40mcc is preferably disposed in heat conductive communication with housing 40 and is disposed and arranged between the housing 40h and the heated manifold 60 to effect such cooling.

FIG. 8 shows in greater detail an embodiment of a rack 26p and pinion 42g type of rotary to linear conversion device 40 with the valve pin 100 attached to and linearly drivable by driven linear axial A movement of the rack 26p.

As shown in FIG. 8 the converter housing 40 can move translationally in any of three dimensions or directions AS (axially), LS (laterally) and front to back, radial or in and out (FBS). The same is true of the converter housings 40 described herein with regard to all other embodiments. Most preferably in all embodiments described herein, the elongated shaft (20) is interconnected between the actuator (200) and the converter (40) by a movement accommodation connector (15, 30) that is adapted to enable translational movement of the converter (40) relative to the actuator (200) and to simultaneously interconnect the actuator (200), the elongated shaft (20) and the converter (40) such that the elongated shaft (20) and the converter (40) are rotatably drivable by the actuator (200). The movement accommodation connector (15, 30) is preferably adapted to enable translational movement of the converter (40) in three axial directions normal to each other or in three dimensions, AS, FBS, LS. The movement accommodation connector (15, 30) preferably comprises one or more of a spline connector (32*s*, 42*s*, 202*s*, 17*s*) such as shown in FIGS. 2, 7A, a universal joint 15, 30 comprised of hinges such as hinges 15*h*1, 15*h*2 and a cross shaft 15*cs*, a flexible connector and a socket connector.

Figure 10:
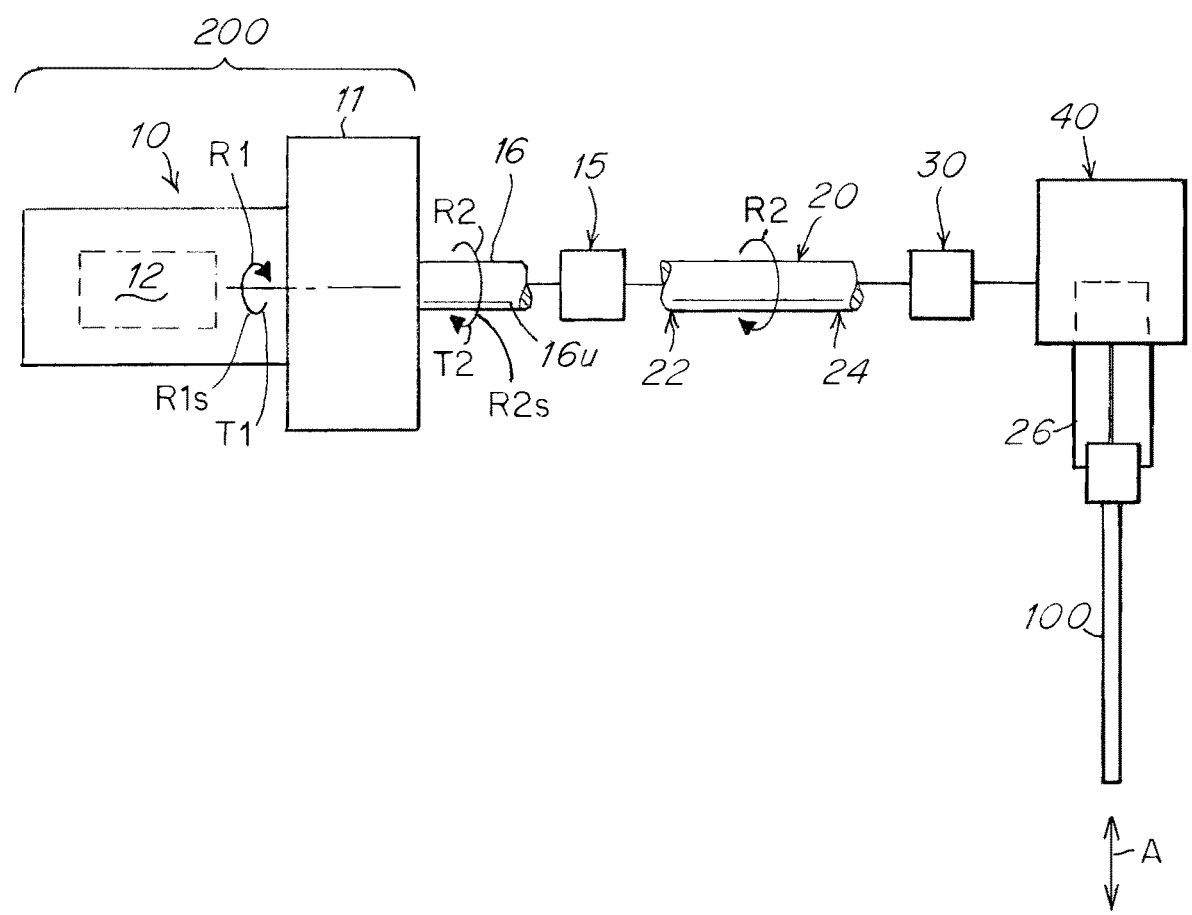
FIG. 10 is a side schematic view of a generic valve in an apparatus according to the invention showing an electrically powered actuator interconnected first downstream to a rotational speed reducing device such as a gear box.

In an embodiment shown in schematic in FIG. 10, the actuator 200 comprises a rotational speed changing or torque changing assembly 11 connected between the rotor 12 of the electrically powered motor 10 and the elongated shaft 20. The assembly 11 is interconnected to the rotor 12 in an arrangement that converts and transmits the rotational speed R1*s* and torque T1 of the rotor 12 to an intermediate shaft 16 that is rotated by the assembly 11 at a different, typically lower, rotational speed R2*s* and torque T2, typically higher, relative to the speed R1*s* and torque T1 of the motor or rotatably driven rotor 12. As shown in FIG. 10 an upstream end 16*u* of the intermediate shaft 16 is interconnected to the downstream end 22 of the rigid elongated shaft 20 in an arrangement where the shaft 20 is rotated at the same rotational speed R2 as the intermediate shaft 16. In another embodiment (not shown) the downstream end 22 of the elongated shaft 20 could be connected to the assembly 11 directly. Such torque increasing assemblies 11, 500, 502, 504, FIGS. 10, 11A-11D, are preferred for use in connection with an electric motor containing actuator 10 where conventional normal sized electric motors that are capable of being mounted in an injection molding environment typically do not have sufficient power to generate torque of high enough degree necessary to drive the rotary to linear conversion device 40 and its interconnected valve pin 100, 130 in a controlled, precise, accurate manner against the high upstream force exerted on the tip end 100*t* by the high pressure injection fluid flowing through the gate 110.

Figure 11A:
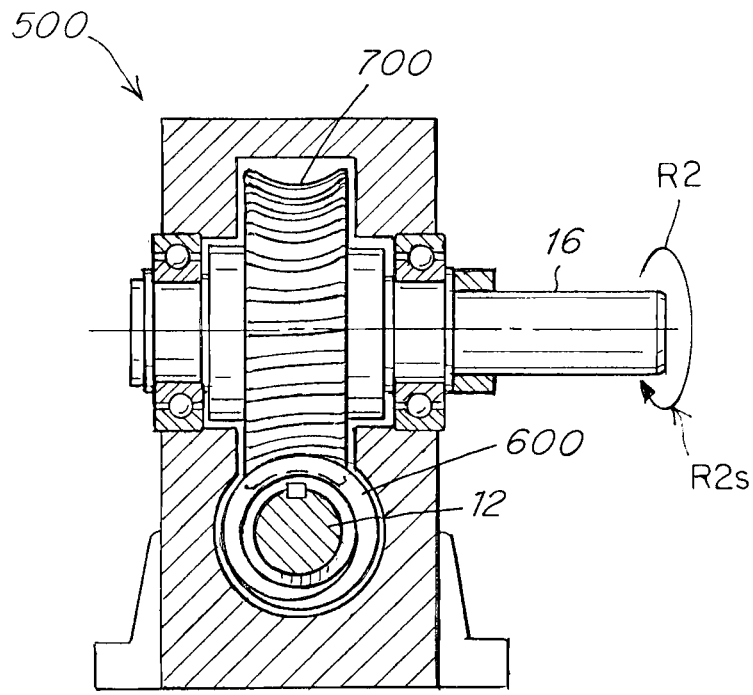
FIGS. 11A, 11B, 11C and 11D are generic illustrations of alternative rotational speed reducing or torque increasing devices that can be used in conjunction with an electrically powered actuator in an apparatus according to the invention.
Figure 11B:
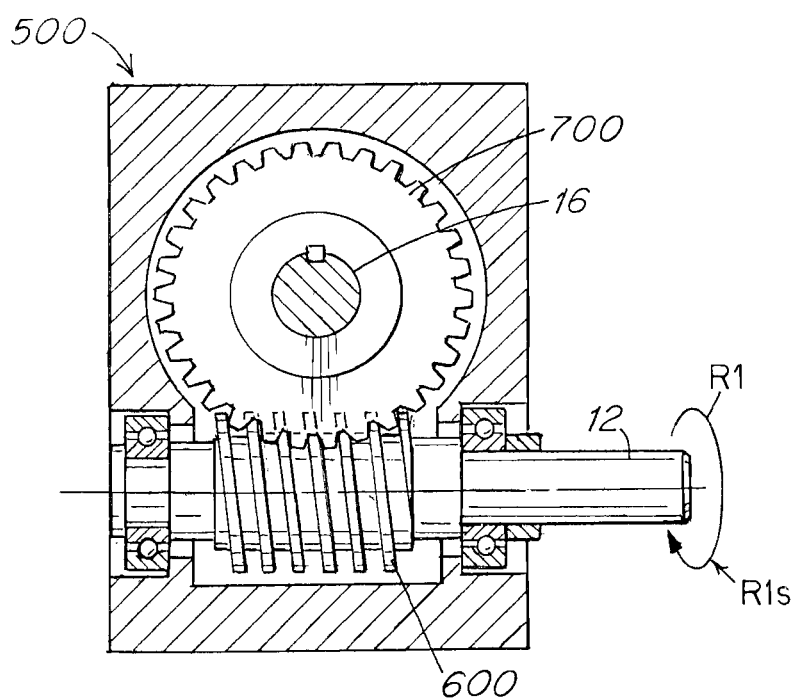
Figure 11C:
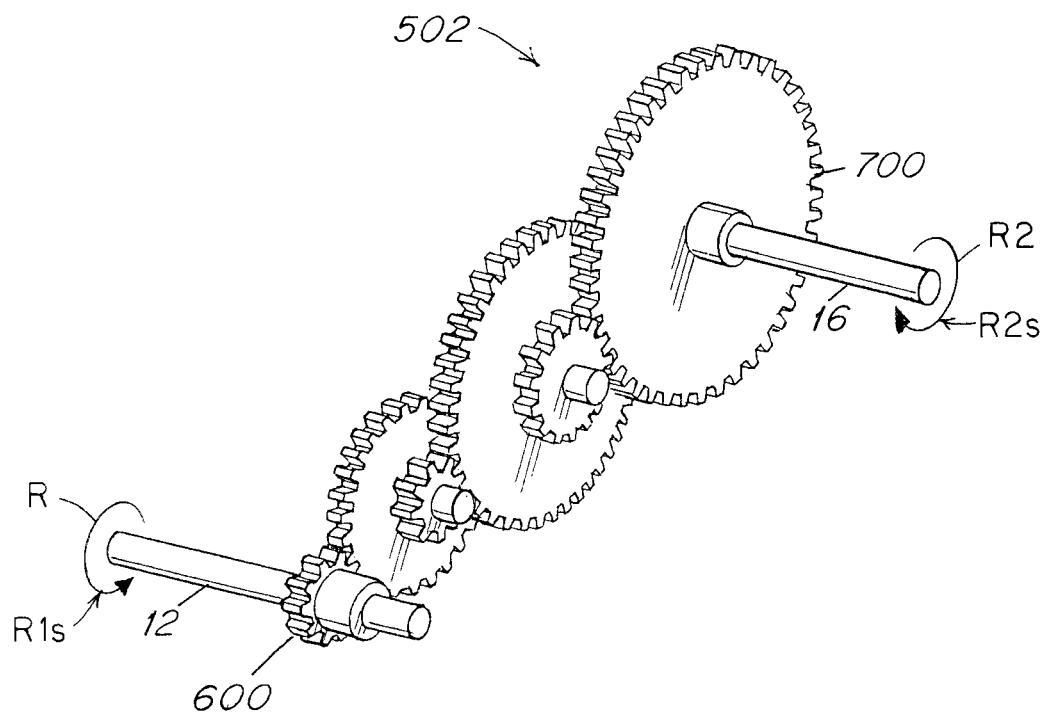
Figure 11D:
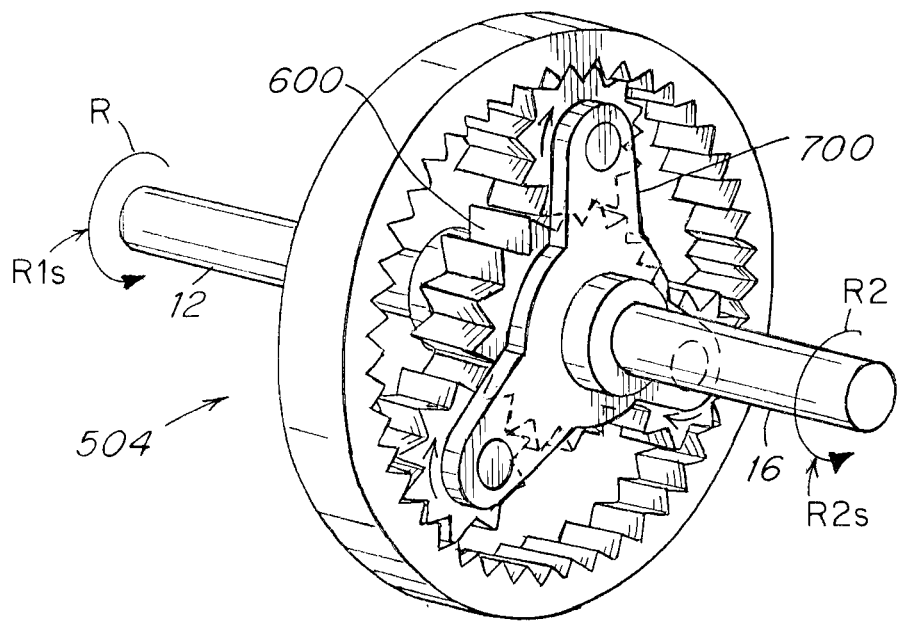

The rotational speed changing or torque changing assembly 11 can comprise an assembly 500, 502, 504 such as shown in FIGS. 11A, 11B (worm gear assembly 500), 11C (spur gear assembly 502), 11D (planetary gear assembly 504) where the rotor 12 of the motor 10 is connected to and rotates the highest speed rotating gear or gear tooth containing component 600 of the assembly and the intermediate shaft 16 is connected to and rotated by the lowest speed rotating gear or gear tooth containing component 700 of the assembly to effectively reduce the rotational speed and increase the torque output of the rotor 12 by transmission of lower speed, higher torque rotation of and to the elongated shaft 20. Other assemblies such as helical gear assemblies or belts and pulley arrangements and assemblies 11, 500, 502, 504 can be used to effect such speed changing and torque changing transmission.

The elongated shaft 20 is adapted to have a length or configuration LC that is selected such that the actuator 200 is mountable on the apparatus 5 in a position or in a disposition relative to the heated manifold 60 such that actuator 200 and electric motor 12 is isolated or insulated from significant or substantial exposure to or transmission of heat from the heated manifold through air or through metal to metal contacts between the heated manifold 60 and the actuator 200.

What is claimed is:

1. An injection molding apparatus comprising an injection molding machine (IMM), a heated manifold (60) having a distribution channel (120) into which injection fluid (9) a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) having a rotor (12) rotatably driven (R1) at a rotor speed (R1*s*), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2*s*), the actuator (200) being mounted to one or the other of a top clamp plate (140) or the injection molding machine (IMM), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a shaft axis (DA), a length or configuration (LC) selected and adapted such that the actuator (200) is mountable on the apparatus in a position or disposition that is isolated, separated or insulated from significant or substantial exposure to or transmission of heat from the heated manifold (60) through air or metal to metal contact between the heated manifold (60) and the actuator (200), wherein the converter (40) is mounted to the apparatus such that the converter (40) travels laterally or in a direction along a lateral axis of the shaft (LS) relative to the actuator (200) on heating of the manifold (60) or upon assembly of the apparatus, the elongated shaft (20) being interconnected to the converter (40) or the actuator (200) by one or more connectors (15, 30) that are adapted to enable lateral movement (LS) between the converter (40) and the actuator (200) while maintaining a rotational interconnection between the elongated shaft and the converter.

2. The apparatus of claim 1 wherein the valve (50) includes a torque increasing or rotational speed reducing device (11) interconnected to and between the rotor (12) and the elongated shaft (20) in an arrangement wherein rotational movement (R1) of the rotor is transmitted to rotational movement (R2) of the elongated shaft (20).

3. An apparatus according to claim 2 wherein the torque increasing or rotational speed reducing device (11) is adapted to convert the rotational speed (R1*s*) and a torque (T1) generated by the rotor (12) to a different rotational speed (R2*s*) and a different torque (T2) generated by the elongated shaft (20).

4. An apparatus according to claim 2 wherein the torque increasing or rotational speed reducing device (11) is adapted to convert the rotational speed (R1*s*) and a torque (T1) generated by the rotor (12) to a lower rotational speed (R2*s*) and a higher torque (T2) generated by the elongated shaft (20).

5. An apparatus according to claim 1 wherein the actuator (200) is controllably rotationally (R1) drivable to controllably drive the valve pin (100) linearly (A) via the interconnection of the rotor (12) to the elongated shaft (20) and the interconnection of the elongated shaft to the converter (40)

and the interconnection of the converter (40) to the linear drive member (26) and the interconnection of the linear drive member (26) to the valve pin (100).

6. An apparatus according to claim 1 wherein the shaft (20) is rigid or comprised of a rigid metal material.

7. An apparatus according to claim 1 further including a position sensor (PS) that senses position of the valve pin (100, 130) or the linear drive member (26).

8. An apparatus according to claim 7 wherein the position sensor (PS) sends a signal indicative of the position of the valve pin to a controller (800) that uses the signal in a program having instructions that use the position of the valve pin (100, 130) or linear drive member (26) to control opening and closing of the gate (110) by the pin (100, 130) or control rate of flow of injection fluid (9) through the gate (110) via controlled positioning of a tip end (100*t*) of the pin (100, 130) relative to the gate.

9. An apparatus according to claim 8 wherein the program includes instructions that instruct the actuator (10, 200) to drive the valve pin (100, 130), based on the use of the signal indicative of position, from a gate closed position upstream at a reduced velocity relative to a maximum velocity over the course of a selected path of travel between the gate closed position and a full upstream valve pin position.

10. An apparatus according to claim 8 wherein the program includes instructions that instruct the actuator (10, 200) to drive the valve pin (100, 130) based on the use of the signal indicative of position, downstream from a selected position upstream of the gate closed position at a reduced velocity relative to a maximum velocity over the course of a selected path of travel between the selected position upstream and the gate closed position.

11. An apparatus according to claim 7 wherein the position sensor (PS) comprises a Hall Effect Sensor that senses a magnetic field generator or magnet (M) that travels linearly together with the linear drive member (26) or valve pin (100, 130).

12. An apparatus according to claim 1 wherein the heated manifold (60) is mounted between the upstream top clamp plate (140) and the mold (70), the heated manifold (60) being expandable or translationally movable relative to the top clamp plate (140) or the injection molding machine.

13. An apparatus according to claim 1 wherein the one or more connectors (15, 30) include a spline device (202*s*, 32*s*, 17*s*, 42*s*).

14. An injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) having a rotor (12) rotatably driven (R1) at a rotor speed (R1*s*), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2*s*), the actuator (200) being mounted to one or the other of a top clamp plate (140) or the injection molding machine (IMM), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a shaft axis (DA), a length or configuration (LC) selected and adapted such that the actuator (200) is mountable on the apparatus in a position or disposition that is isolated, separated or insulated from significant or substantial exposure to or transmission of heat from the heated manifold (60) through air or metal to metal contact between the heated manifold (60) and the actuator (200), wherein the converter is mounted to the apparatus such that the converter (40) travels in a direction radially or front to back (FBS), axially (AS) or along another direction relative to the actuator (200) on heating of the manifold (60) or upon assembly of the apparatus, the elongated shaft (20) being interconnected to the converter (40) or the actuator (200) by one or more connectors (15, 30) that are adapted to enable translational movement of the converter (40) in a radial or front to back (FBS), or axial (AS) direction of the converter (40) and maintain a rotational interconnection of the elongated shaft (20) to the actuator (200) and to the converter (40).

15. An apparatus according to claim 14 wherein the one or more connectors (15, 30) include one or more hinges (15*h*1, 15*h*2) that are pivotably interconnected in an arrangement that enables the one or more hinges (15*h*1, 15*h*2) to co rotate with each other and simultaneously pivot relative to each other.

16. An apparatus according to claim 1 wherein the elongated shaft (20) is interconnected to the converter (40) in an arrangement wherein the shaft axis (DA) is disposed generally radially normal to the linear path of travel (A) of the valve pin.

17. An apparatus according to claim 1 wherein the valve pin (100) is mounted to the manifold (60).

18. An apparatus according to claim 1 wherein the converter (40) is mounted to the heated manifold (60) such that the converter (40) travels together with movement of the heated manifold (60) and the actuator (200) is mounted to the top clamp plate (140), the top clamp plate (140) and the heated manifold moving relative to each other on heating of the heated manifold (60) to operating temperature.

19. An apparatus according to claim 1 wherein the converter (40) and the actuator (200) are mounted to the top clamp plate (140), the top clamp plate (140) and the heated manifold (60) moving relative to each other on heating of the heated manifold to operating temperature.

20. An injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) having a rotor (12) rotatably driven (R1) at a rotor speed (R1s), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s), the actuator (200) being mounted to one or the other of a top clamp plate (140) or the injection molding machine (IMM), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a shaft axis (DA), a length or configuration (LC) selected and adapted such that the actuator (200) is mountable on the apparatus in a position or disposition that is isolated, separated or insulated from significant or substantial exposure to or transmission of heat from the heated manifold (60) through air or metal to metal contact between the heated manifold (60) and the actuator (200), wherein the converter (40) is mounted to the heated manifold (60) in an arrangement wherein the converter (40) and converter housing (40h) receive heat generated by the heated manifold (60), the apparatus including a cooling device (300) comprised of a heat conductive plate (300p) having a first downstream facing heat conductive undersurface (300s2) mounted onto or into heat conductive engagement with a heat conductive surface (40ss) of the converter (40), the cooling device including heat conductive wings or projections (300w) that laterally extend from the plate (300p) having surfaces (300s1) adapted to engage a heat conductive surface (140ps) of the top clamp plate (140, 140p), the heat conductive plate (300p) transmitting heat received by the converter (40) and the housing (40h) from the heat conductive surface (40ss) through the wings or projections (300w) to the top clamp plate (140, 140p).

21. An apparatus according to claim 20 wherein the wings or projections (300w) of the cooling device comprise a resilient or resiliently deformable spring, the clamp plate (140, 140p), cooling device (300), mold, manifold and converter (40) being adapted such that when assembled together in an operative arrangement, the wings or projections 1300w1 are spring loaded urging the upstream facing surfaces (300s) into compressed thermally conductive engagement with a complementary surface (140ps) of the top clamp plate (140, 140p).

22. An injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) having a rotor (12) rotatably driven (R1) at a rotor speed (R1s), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s), the actuator (200) being mounted to one or the other of a top clamp plate (140) or the injection molding machine (IMM), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a shaft axis (DA), a length or configuration (LC) selected and adapted such that the actuator (200) is mountable on the apparatus in a position or disposition that is isolated, separated or insulated from significant or substantial exposure to or transmission of heat from the heated manifold (60) through air or metal to metal contact between the heated manifold (60) and the actuator (200), wherein the elongated shaft (20) is interconnected between the actuator (200) and the converter (40) by a movement accommodation connector (15, 30) adapted to enable translational movement of the converter (40) relative to the actuator (200) and to simultaneously interconnect the actuator (200), the elongated shaft (20) and the converter (40) such that the elongated shaft (20) and the converter (40) are rotatably drivable by the actuator (200).

23. An apparatus according to claim 22 wherein the movement accommodation connector (15, 30) is adapted to enable translational movement of the converter (40) in three axial directions normal to each other or in three dimensions.

24. An apparatus according to claim 22 wherein the movement accommodation connector (15, 30) comprises one or more of a spline connector, a universal joint, a flexible connector and a socket connector.

25. A method of performing an injection molding cycle comprising injecting an injection fluid into a cavity of a mold employing an apparatus according to claim 1.

26. An injection molding apparatus comprising an injection molding machine (IMM), a heated manifold (60) having a distribution channel (120) into which injection fluid (9), a mold (70) having a cavity (80) communicating with a fluid delivery channel (130) that receives injection fluid (9) from the distribution channel (120), the fluid delivery channel (130) delivering fluid (9) at a downstream end to a gate (110) that communicates with the cavity (80), the gate (110) being controllably opened and closed to control flow of the fluid (9) into the cavity (80) during the course of an injection cycle, the apparatus including a valve (50) comprised of:

an actuator (200) mounted to one or the other of a top clamp plate (140) and the injection molding machine (IMM), the actuator (200) having a rotor (12) rotatably driven (R1) at a rotor speed (R1s), the rotor (12) being interconnected to a distal end (22) of an elongated shaft (20) and adapted to drivably transmit rotational motion (R1) of the rotor to rotational motion (R2) of the elongated shaft (20) for rotation at a shaft speed (R2s), the elongated shaft (20) being interconnected at a proximal end (24) to a converter (40), the converter (40) being adapted to transmit rotational motion (R2) of the elongated shaft (20) directly to driven linear motion (A) of a linear drive member (26), the linear drive member (26) being interconnected to a valve pin (100) arranged within the fluid delivery channel for upstream and downstream movement along a linear path of travel (A) between gate closed and gate open positions via the driven linear motion (A) of the linear drive member (26), the elongated shaft (20) having a length or configuration (LC) selected and adapted such that the actuator (200) is mountable on the apparatus in a position or disposition that is isolated or insulated from significant or substantial exposure to or transmission of heat from the heated manifold (60) through air or through metal to metal contact between the heated manifold (60) and the actuator (200), the converter (40) being mounted to the heated manifold (60) in an arrangement wherein the converter (40) and converter housing (40*h*) receive heat generated by the heated manifold (60), the apparatus including a cooling device (300) comprised of a heat conductive plate (300*p*) having a first downstream facing heat conductive undersurface (300*s*2) mounted onto or into heat conductive engagement with a heat conductive surface (40*ss*) of the converter (40), the cooling device including heat conductive wings or projections (300*w*) that laterally extend from the plate (300*p*) having surfaces (300*s*1) adapted to engage a heat conductive surface (140*ps*) of the top clamp plate (140, 140*p*), the heat conductive plate (300*p*) transmitting heat received by the converter (40) and the housing (40*h*) from the heat conductive surface (40*ss*) through the winqs or projections (300*w*) to the top clamp plate (140, 140*p*).

27. An apparatus according to claim 26 wherein the wings or projections (300*w*) of the cooling device comprise a resilient or resiliently deformable spring, the clamp plate (140, 140*p*), cooling device (300), mold, manifold and converter (40) being adapted such that when assembled together in an operative arrangement, the wings or projections 300*w* are spring loaded urging the upstream facing surfaces (300*s*) into compressed thermally conductive engagement with a complementary surface (140*ps*) of the top clamp plate (140, 140*p*).

\* \* \* \* \*

UNITED STATES PATENT AND TRADEMARK OFFICE
CERTIFICATE OF CORRECTION

PATENT NO. : 10,792,849 B2  Page 1 of 1
APPLICATION NO. : 15/860788
DATED : October 6, 2020
INVENTOR(S) : Christopher Lee and Vito Galati It is certified that error appears in the above-identified patent and that said Letters Patent is hereby corrected as shown below:

Column 15, Line 64 (Claim 1, Line 3) - after "9" insert --is fed--.

Column 17, Line 48 (Claim 14, Line 3) - after "9" insert --is fed--.

Column 18, Line 59 (Claim 20, Line 3) - after "9" insert --is fed--.

Column 19, Line 53 (Claim 21, Line 7) - change "(1300w1)" to --300w--.

Column 19, Line 59 (Claim 22, Line 3) - after "9" insert --is fed--.

Column 20, Line 51 (Claim 26, Line 3) - after "9" insert --is fed--.

Signed and Sealed this
First Day of December, 2020

Andrei Iancu
*Director of the United States Patent and Trademark Office*